(12) United States Patent
Carcangiu et al.

(10) Patent No.: US 7,641,522 B2
(45) Date of Patent: Jan. 5, 2010

(54) ELECTRICAL-CONNECTION DEVICE, PARTICULARLY FOR PHOTOVOLTAIC-CELL SOLAR PANELS

(75) Inventors: Giacomo Carcangiu, Genova (IT); Marcello Sardo, Cuneo (IT); Ignazio Carcangiu, Sadali (IT); Rocco Sardo, Cuneo (IT)

(73) Assignee: Lasen Development LLC, Wilmington, DE (US)

( * ) Notice: Subject to any disclaimer, the term of this patent is extended or adjusted under 35 U.S.C. 154(b) by 0 days.

(21) Appl. No.: 12/001,358

(22) Filed: Dec. 11, 2007

(65) Prior Publication Data
US 2009/0149069 A1 Jun. 11, 2009

(51) Int. Cl.
*H01R 4/30* (2006.01)
(52) U.S. Cl. ...................... 439/801; 439/271
(58) Field of Classification Search ................. 439/281, 439/801, 810, 92, 95, 271, 587, 755
See application file for complete search history.

(56) References Cited

U.S. PATENT DOCUMENTS

| | | | | |
|---|---|---|---|---|
| 3,474,386 A | * | 10/1969 | Link | 439/181 |
| 3,668,614 A | * | 6/1972 | Ball | 439/185 |
| 3,930,709 A | * | 1/1976 | Stanger et al. | 439/185 |
| 4,085,989 A | * | 4/1978 | McCardell | 439/595 |
| 4,643,511 A | * | 2/1987 | Gawlik et al. | 439/755 |
| 5,346,408 A | * | 9/1994 | Chupak | 439/522 |
| 5,513,075 A | | 4/1996 | Capper et al. | |
| 5,645,457 A | * | 7/1997 | Hirayama et al. | 439/801 |
| 6,325,667 B2 | * | 12/2001 | Sawayanagi | 439/537 |
| 6,666,689 B1 | * | 12/2003 | Savage, Jr. | 439/56 |
| 7,086,900 B2 | * | 8/2006 | Comini | 439/598 |

FOREIGN PATENT DOCUMENTS

| | | |
|---|---|---|
| DE | 20311183 U1 | 7/2004 |
| EP | 0033031 A2 | 8/1981 |
| EP | 1006593 A1 | 6/2000 |
| EP | 1102354 A2 | 5/2001 |

OTHER PUBLICATIONS

International Search Report and Written Opinion dated Feb. 20, 2009, relating to International Application No. PCT/EP2008/067258, 13 pages.

* cited by examiner

*Primary Examiner*—Thanh-Tam T Le
(74) *Attorney, Agent, or Firm*—Seed IP Law Group PLLC

(57) ABSTRACT

An electrical-connection device, particularly for photovoltaic-cell panels, has: a first electrical terminal, designed to be connected to apparatuses for generation or use of electrical energy and to extend in a fixed position through a wall for support of the connection device; a seal for fluid-tight coupling of the first electrical terminal to the supporting wall; a second electrical terminal connected to the first electrical terminal and to an electrical wiring external to the supporting wall; and an electrically insulated liquid-tight chamber, housing at least partially the first electrical terminal and the second electrical terminal.

12 Claims, 2 Drawing Sheets

ELECTRICAL-CONNECTION DEVICE, PARTICULARLY FOR PHOTOVOLTAIC-CELL SOLAR PANELS

The present invention relates to an electrical-connection device, particularly for photovoltaic-cell solar panels, to which the ensuing treatment will make explicit reference, without this implying any loss in generality.

BACKGROUND OF THE INVENTION

In general, the present invention finds advantageous application in all those cases where it becomes necessary to provide an electrical connection between two environments, which must be kept electrically insulated and in at least one of which there may be envisaged the presence of a liquid.

In the specific field of photovoltaic-cell solar panels it is known to use panels comprising an external fluid-tight casing permeable to light, housed in which is a plurality of photovoltaic cells immersed in a liquid.

Following upon exposure of the panel to solar radiation and to the normal activity of the photovoltaic cells, the photovoltaic cells themselves convert part of the incident solar energy into electrical energy that is transferred on the outside via different electrical-connection devices, which, in some cases, prove to be relatively complex and costly and, in others, decidedly simpler but with an unsatisfactory level of efficiency, reliability, and safety over time.

SUMMARY OF THE INVENTION

The aim of the present invention is to provide an electrical-connection device, particularly for solar panels, which will present a high and invariant efficiency and functional reliability and a particularly contained cost.

Provided according to the present invention is an electrical-connection device, particularly for photovoltaic-cell panels, comprising a first electrical terminal, designed to be connected to means for generation or use of electrical energy and to extend in a fixed position through a wall for support of the connection device; sealing means for fluid-tight coupling of said first electrical terminal to said supporting wall; a second electrical terminal, connected to said first electrical terminal and to an electrical wiring external to said supporting wall; and an electrically insulated fluid-tight chamber, housing at least partially said first and second electrical terminals.

BRIEF DESCRIPTION OF THE DRAWINGS

The invention will now be described with reference to the annexed plates of drawings, which illustrate a non-limiting example of embodiment thereof, and in which.

DETAILED DESCRIPTION OF THE INVENTION

Figure 1:
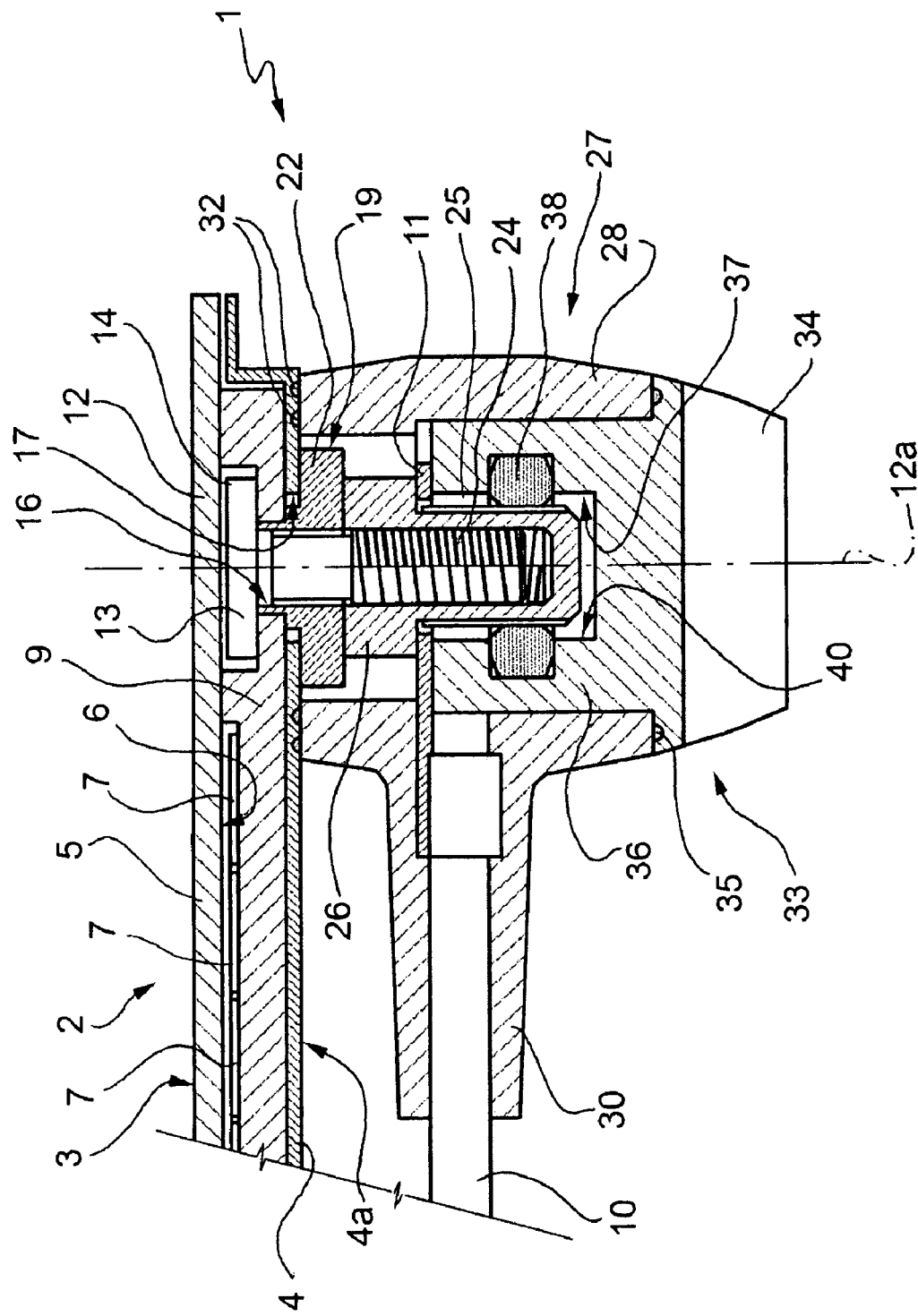
FIG. 1 is a cross-sectional illustration of a preferred embodiment of the electrical-connection device according to the present invention coupled to an external casing of a solar panel.
Figure 2:
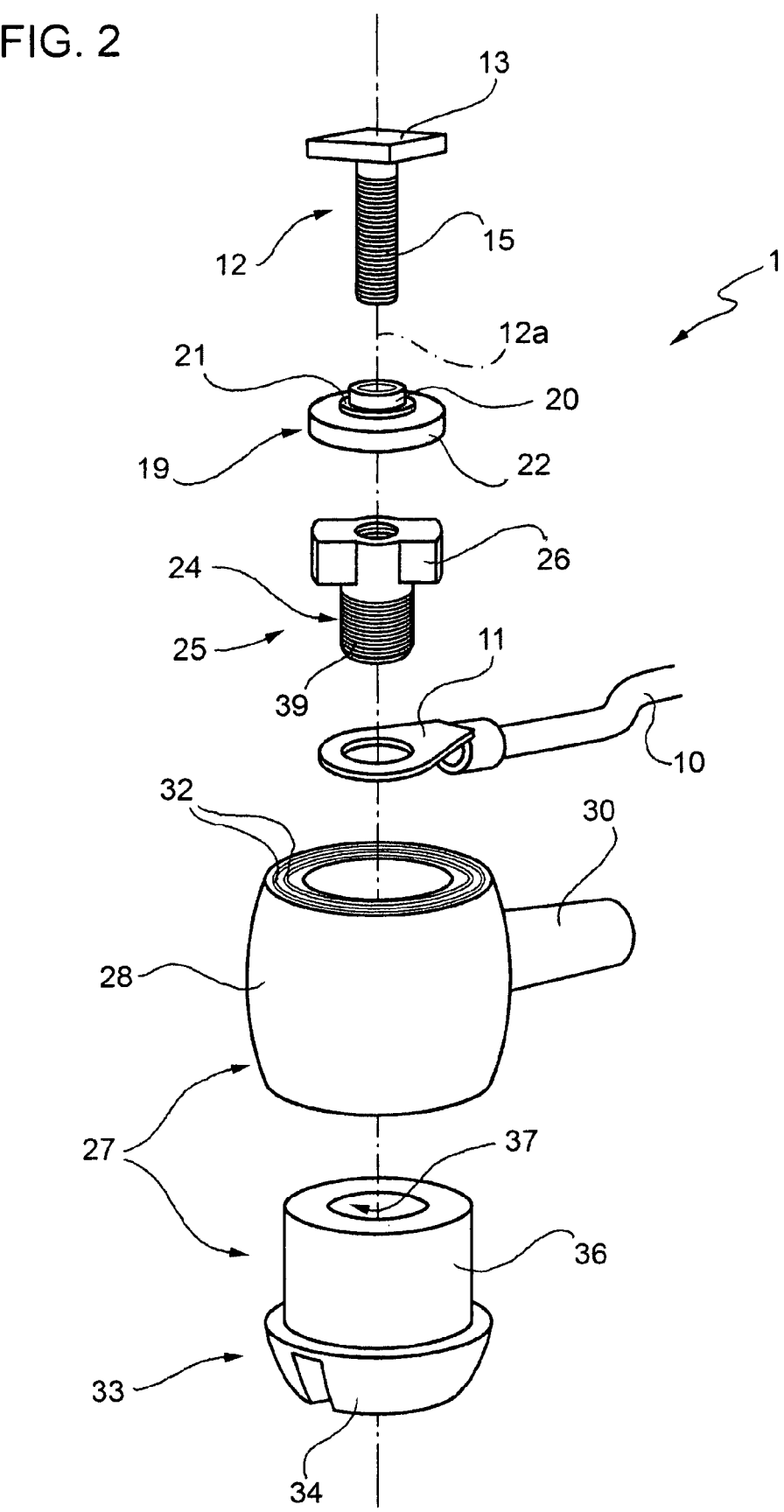
FIG. 2 is an exploded perspective view of the device of FIG. 1.

In FIGS. 1 and 2, designated by 1 is a fluid-tight electrical-connection device, particularly, but not exclusively, for a photovoltaic-cell solar panel 2, to which the ensuing treatment will make explicit reference, without this implying any loss in generality.

In the particular example described, the photovoltaic solar panel 2 (FIG. 1) comprises a shell or external casing 3, which in turn comprises a rear wall or tray 4, a front wall 5 facing the wall 4 and made of a material permeable to light, for example glass, and two terminal closing elements, not visible in the attached figures.

The front wall 5 and rear wall 4, and the terminal closing elements delimit between them a fluid-tight chamber 6, which houses a plurality of photovoltaic cells 7 supported in fixed and pre-set positions by an attachment and supporting plate 9, which is also housed in the fluid-tight chamber 6 and made at least in part of metal material. Within the chamber 6, the photovoltaic cells are at least partially embedded in a cooling liquid, which is made to circulate inside the chamber 6 itself via a hydraulic circuit connected to a heat exchanger (not illustrated) external to the chamber 6.

The photovoltaic cells 7 are connected to an external electrical wiring 10, terminating with a cable lug or eyelet 11 via the device 1, which comprises a screw 12 made of metal material that forms a terminal for electrical connection of the photovoltaic cells 7 with the outside. The screw 12 comprises a head 13 housed in the chamber 6, set bearing upon a shoulder 14 provided on the plate 9 and on the wall 4 and blocked in an angularly fixed position with respect to the plate 9. The screw 12 comprises, then, an externally threaded stem 15 extending through two through holes 16 and 17, which are made in the plate 9 and, respectively, in the rear wall 4, coaxially to an axis 12a of the screw 12. Fitted on the stem 15 is an annular seal 19 comprising, starting from its free end facing the head 13 of the screw 12, a cylindrical end stretch 20 extending through the hole 16 and set bearing upon the head 13 of the screw, an intermediate cylindrical stretch 21 extending through the hole 17 and having an outer diameter larger than that of the cylindrical stretch 20, and a terminal flange 22 set bearing upon an outer surface 4a of the rear portion 4. Screwed on the stem 15 of the screw 12 is an internally threaded blind cylindrical portion 24 of a cap nut 25 made of metal material, a milled external terminal flange 26 of which tightens the flange 22 against the rear wall 4a to form a fluid-tight seal. Fitted on the blind cylindrical portion 24 is the cable lug 11, which extends, together with a terminal stretch of the wiring 10, within a pipe-like body 27 made of insulating material for electrical insulation from outside of the cable lug 11 and the cap nut 25.

The pipe-like body 27, which, together with the cap nut 25, the seal 19, and the cable lug 11, forms part of the electrical-connection device 1, comprises a barrel-shaped hollow portion 28, which surrounds the cable lug 11, the cap nut 25, and the flange 22 of the seal 19. The pipe-like body 27 moreover comprises a hollow appendage 30, which radially and integrally extends from the barrel-shaped portion 28 and envelops the electrical wiring 10 and part of the cable lug 11 in a fluid-tight manner. The barrel-shaped portion 28 is set bearing upon the surface 4a of the wall 4 and is coupled to the surface 4a itself in a fluid-tight manner via two concentric front sealing projections 32 made in a single piece with the barrel-shaped portion 28 itself. The portion 28 partially houses a mushroom-shaped body 33, which forms part of the pipe-like body 27 and closes the portion 28 in a fluid-tight manner. The body 33 comprises a head 34 with a slot for a screw-driver set bearing upon a front surface of the barrel-shaped portion 28 and coupled to the front surface itself in a fluid-tight manner by a front annular sealing projection 35 made in a single piece with the barrel-shaped portion 28 itself. The body 33 moreover comprises a hollow stem 36, which terminates bearing upon the cable lug 11 and delimits a blind hole 37, housing, with radial play, the blind cylindrical portion 24 of the cap nut 25. Blocked in the stem 36 in a fixed position and coaxially to the axis 12a is a tightening nut 38, which is screwed on an externally threaded terminal stretch 39 of the blind cylindrical portion 24 for gripping the cable lug 11 between the cap nut 25 and the flange 26 and forcing in a fluid-tight way the projections 32 against the surface 4a of the rear wall 4 and the projection 35 against its head 34.

Installation of the device 1 is performed as defined in what follows. During assembly of the solar panel 2, the screw 12 is coupled to the plate 9, and then the seal 19 is inserted in the holes 16 and 17 and the flange 22 brought to bear upon the surface 4a. At this point, the cap nut 25 is screwed on the stem 15 until it forces the flange 22 against said part and insulates the chamber 6 from the outside in a fluid-tight manner, after which the cable lug 11, previously housed in the barrel-shaped body 28 is fitted on the portion 24, brought to bear upon the flange 26 and tightened against the flange itself via the lid 33, the nut 38 of which is screwed on the portion 24 itself and gripped by pack-tightening together the plate 9, the tubular portion 28, and the cable lug 11, to form in this way an external fluid-tight chamber 40 insulated from the chamber 6.

From the foregoing, it appears evident how the characteristics of implementation of the device 1 described, on the one hand, render the chamber housing the photovoltaic cells fluid-tight preventing any leakage of liquid or entry of external agents into the chamber itself and, on the other, insulate electrically from outside the cable lug 11, part of the corresponding electrical wiring and the stem of the screw 12 for electrical connection through the casing by enclosing them in a dedicated chamber. Since the chamber 40 is fluid-tight, it receives and withholds any possible leakage of fluid from the chamber 6, preventing the fluid from being dispersed into the surrounding environment, thus contaminating it, once again, however, without ever jeopardizing the electrical functionality of the solar panel. It is therefore evident that the device 1 described presents an efficiency and reliability that are not only high but are practically invariant over time.

From the foregoing, it appears evident that modifications and variations may be made to the device 1 described herein, without thereby departing from the scope of protection defined by the claims.

In particular, the screw 12 could be different from the one indicated and, for example, of the stud-screw type with a terminal or intermediate portion screwed in a threaded through hole of the plate 9.

Finally, from the foregoing it appears evident that the device 1 described can find applications different from the one indicated and, in particular, in all the cases in which is it becomes necessary to make a fluid-tight electrical connection through a wall separating two environments, at least one of which houses or is traversed by a liquid.

The invention claimed is:

1. An electrical-connection device comprising:
   a supporting wall;
   a body having a tubular portion and a cap rotatably coupled to the tubular portion;
   a first electrical terminal configured to be electrically coupled to a device adapted to generate or use electrical energy, at least a portion of the first electrical terminal extending through the supporting wall and being positioned in the tubular portion;
   a first fluid-tight sealing member positioned between the first electrical terminal and the supporting wall;
   a second electrical terminal electrically coupled to the first electrical terminal and configured to be electrically coupled to an electrical power source;
   a cap nut positioned in the body and having a first region and a second region, the first region coupled to the first electrical terminal;
   an electrically insulated fluid-tight chamber formed between the supporting wall and the cap; and
   an internal fastener positioned in the body and fixedly coupled to the cap to rotate therewith, the internal fastener threadedly coupled to the second region of the cap nut.

2. The device according to claim 1, wherein the fluid-tight chamber extends completely on an opposite side of the supporting wall with respect to the device configured to generate or use electrical energy.

3. The device according to claim 1, further comprising:
   electrical wiring coupled to the second electrical terminal and partially positioned within the fluid-tight chamber.

4. The device according to claim 1, wherein the tubular portion surrounds the first electrical terminal, the tubular portion and the cap being made from an electrically insulating material, the internal fastener tightening the supporting wall, tubular portion, and cap.

5. The device according to claim 4, wherein the internal fastener is positioned between the cap and the first electrical terminal.

6. The device according to claim 1, wherein the cap includes a stem having a bore, and the cap nut includes a cylindrical portion positioned in the bore of the stem, the internal fastener fixedly coupled to an inner surface of the stem forming the bore, and threadedly coupled to an outer surface of the cylindrical portion of the cap nut.

7. The device according to claim 6, wherein the cap nut includes a flange portion coupled to the cylindrical portion, the second electrical terminal being forced against the flange portion by the stem of the cap.

8. The device according to claim 1, wherein the first fluid-tight sealing member includes a single seal fitted on the first electrical terminal and configured to be tightened against the supporting wall by the cap nut.

9. The device according to claim 1, further comprising:
   a second sealing member positioned between the tubular portion and the cap, at least part of the second sealing member being integral with one of the cap or the tubular portion; and
   a third sealing member positioned between the supporting wall and the tubular portion, at least part of the third sealing member being integral with the tubular portion.

10. The device according to claim 9, wherein the second and third sealing members include respective annular ribbings projecting from opposite front surfaces of said tubular portion and fabricated from a unitary body of material with the tubular portion.

11. An electrical-connection device comprising:
    a first electrical terminal designed to be connected to means for generation or use of electrical energy and having a head configured to engage a supporting wall and a threaded stem configured to extend through the supporting wall;
    sealing means for fluid-tight coupling of the first electrical terminal to the supporting wall;
    a second electrical terminal electrically connected to the first electrical terminal and to an electrical wiring external to the supporting wall;
    a tubular body surrounding the first electrical terminal and fabricated from an electrically insulating material;
    a lid including a hollow stem having a bore and extending from the lid, the lid being coupled to the tubular body toward an end thereof, the stem positioned internally with respect to the tubular body, the lid fabricated from an electrically insulating material, the tubular body and the lid forming an electrically insulated fluid-tight chamber between the supporting wall and the lid, the fluid-tight chamber at least partially housing the first and second electrical terminals; and forcing means for pack-tightening the supporting wall, the tubular body, and the lid together, the forcing means including a screw assembly having a cap nut including a metal body having a threaded outer surface and a blind bore threadedly receiving the stem of the first electrical terminal, and an internal screw fixedly connected to the bore of the hollow stem of the lid and threadedly coupled to the outer surface of the cap nut metal body.

12. An electrical-connection device comprising:

a first electrical terminal designed to be connected to means for generation or use of electrical energy and to extend in a fixed position through a supporting wall;

first sealing means for fluid-tight coupling of the first electrical terminal to the supporting wall;

a second electrical terminal electrically connected to the first electrical terminal and to an electrical wiring external to the supporting wall;

a tubular body surrounding the first electrical terminal fabricated from an electrically insulating material;

a lid coupled to the tubular body toward an end thereof to close the end of the tubular body, the lid fabricated from an electrically insulating material, the tubular body and the lid forming an electrically insulated fluid-tight chamber between the lid and the wall, the fluid-tight chamber at least partially housing the first and second electrical terminals;

forcing means for pack-tightening the supporting wall, the tubular body, and the lid together and for delimiting the electrically insulated fluid-tight chamber;

second sealing means for fluid tight coupling of the tubular body and the lid positioned between the tubular body and the lid, at least part of the second sealing means being integrally formed with at least one of the tubular body and the lid; and third sealing means for fluid tight coupling of the supporting wall and the tubular body positioned between the supporting wall and the tubular body, at least part of the second and third sealing means being integrally formed with the tubular body.

* * * * *